United States Patent Office 3,647,761
Patented Mar. 7, 1972

---

3,647,761
POLYAMIDES OF A $C_{7-12}$ ALIPHATIC DICARBOXYLIC ACID, TEREPHTHALIC ACID AND AN ALIPHATIC DIAMINE
James S. Ridgway and Oscar A. Pickett, Jr., Pensacola, Fla., assignors to Monsanto Company, St. Louis, Mo.
No Drawing. Continuation-in-part of application Ser. No. 760,087, Sept. 16, 1968. This application June 19, 1970, Ser. No. 47,899
Int. Cl. C08g 20/20
U.S. Cl. 260—78 R      10 Claims

ABSTRACT OF THE DISCLOSURE

Fiber-forming polyamides prepared by the condensation of substantially equimolecular proportions of hexamethylene diamine and a mixture of dibasic acids consisting of 50 to 80 mole percent of a $C_{7-12}$ saturated n-aliphatic dicarboxylic acid and from 50 to 20 mole percent of terephthalic acid are particularly useful in the manufacture of hosiery and conjugate yarn.

---

This application is a continuation-in-part of U.S. Ser. No. 760,087, filed Sept. 16, 1968 now abandoned.

BACKGROUND OF THE INVENTION

Recently, much research effort has been expended in developing conjugate yarn, that is yarn composed of two components having different shrinkage properties. This differential shrinkage allows the spun fiber to crimp, either upon drawing or being subjected to steam, giving bulk to the yarn. Conjugate yarn having one component made from polyhexamethylene adipamide (nylon 66) is particularly desirable since fibers made from nylon 66 are relatively inexpensive. Accordingly, a need exists for providing polyamide fibers which have a boiling water shrinkage different from that of nylon 66 fibers, and particularly, polyamide fibers having a boiling water shrinkage greater than that of nylon 66 fibers. A fiber of this description would not only be useful in conjugate spinning with nylon 66, but would also be useful in manufacturing hosiery.

An object of the present invention therefore is to provide polyamide fibers having a shrinkage when subjected to boiling water greater than that of nylon 66 fibers.

A further object of the invention is to provide polyamides which are useful in conjugate spinning operations with nylon 66.

Still another object is to provide polyamide fibers which are useful in manufacturing hosiery.

Yet another object is to provide a polyamide which may be manufactured into transparent fibers and films.

SUMMARY OF THE INVENTION

In accordance with the present invention the above objects are accomplished by providing random fiber-forming polyamides which are the condensation product of a mixture of reactants consisting of 50 mole percent of hexamethylene diamine, 25 to 40 mole percent of an aliphatic dicarboxylic acid of the formula $$HOOC—(CH_2)_m—COOH$$

in which m is an integer of from 5 to 12, and 25 to 10 mole percent of terephthalic acid or the amide-forming derivatives of these compounds.

The fiber-forming polyamides described herein consist of from 20 to 50 mole percent of randomly recurring units of the structure

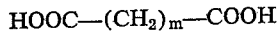

and of from 80 to 50 mole percent of randomly recurring units of the structure

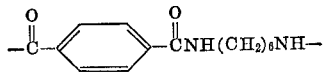

The latter units are formed by the reaction of hexamethylene diamine with an acid selected from pimelic, suberic, azelaic, sebacic, hendecanedioic, dodecanedioic, brassylic and tetradeconedioic acids.

The polyamides described herein are prepared by procedures well-known in the art and commonly employed in the manufacture of simple polyamides. That is, the reactants are heated at a temperature of from 180° C. to 300° C., and preferably, from 200° C. to 295° C. until the product has a sufficiently high molecular weight to exhibit fiber-forming properties, which properties are reached when the polyamide has an intrinsic viscosity of at least 0.4. The reaction may be conducted at superatmospheric, atmospheric or subatmospheric pressure. Often it is desirable, especially in the last stage of the reaction, to employ conditions, e.g., reduced pressure, which will aid in the removal of the reaction by-products. Preferably, the reaction is carried out in the absence of oxygen, for example, in an atmosphere of nitrogen. The polyamides may, if desired, contain additives which are commonly incorporated into polymers, such as stabilizers, antistatic agents, plasticizers, delustrants and the like.

The polyamides of the invention are preferably prepared by copolymerizing a mixture of salts consisting of the hexamehtylene diammonium salt of terephthalic acid and the hexamethylene diammonium salt of an acid of the formula HOOC—$(CH_2)_m$—COOH; however, if desired, the polyamides may also be prepared by polymerizing a mixture of the monomers in which substantially equimolar amounts of diamine and acid are used.

The bulk which may be imparted to conjugate yarn depends upon the difference in shrinking properties of the two component fibers, and by using pre-selected fibers of given shrinkages the amount of bulking may be controlled. In this respect the shrinkage of fibers prepared from the polyamides described herein may be controlled by pre-selection of the mole ratio of reactants employed in their preparation as well as by pre-selection of the aliphatic dicarboxylic acid reactant; as the mole percent of hexamethylene terephthalamide units in the polymer chains varies, the boiling water shrinkage of the polyamides also varies—the highest shrinkage generally being obtained at 40 mole percent terephthalamide content. The polyamides are transparent provided the mole percent of hexamethylene terephthalamide units in the polyamide chain is between 20 and 50 mole percent.

DESCRIPTION OF THE PREFERRED EMBODIMENTS

To further illustrate the invention the following example is given.

Example

The following material was charged to an evaporator: a 49% by weight aqueous hexamethylene diammonium terephthalate salt solution and a 75% by weight aqueous hexamethylene diammonium hendecanediate salt solution, the mole ratio of terephthalate salt to hendecanediate salt being 20 to 80. After purging the evaporator with 250 p.s.i. saturated steam to remove air, the evaporator was closed at a residual steam pressure of 15 p.s.i. Evaporative heat was carried out with part of the water being removed while maintaining 13 p.s.i. pressure. The solution was then transferred to an autoclave, heated to approximately 220° C. and the pressure brought to 250 p.s.i. The solution was then heated for 3 hours. and water was bled-off to maintain a steady 250 p.s.i. pressure. The pressure was then gradually reduced to atmospheric during which time the temperature rose to approximately 290° C. and the heating was continued for an additional hour. The polymer was spun directly from the bottom of the autoclave to yield a monofilament.

Additional monofilaments were then prepared in the manner just described with the exception that other acids of the formula HOOC—$(CH_2)_m$—COOH were used instead of hendecanedioic acid. Several monofilaments of different composition were prepared with each acid, by varying the mole ratio of reactants as shown in the table below. The melting point and percent boiling water shrinkage of each filament was determined, as well as the general appearance of the filament observed. This data is given in the table below. Boiling water shrinkage of the filament was determined by exposing the filaments to boiling water for a period of 5 minutes and then measuring the decrease in their length; this value, expressed as a percentage of their length before exposure to boiling water, is the percent boiling water shrinkage of the fiber.

In the table the following abbreviations are used:

Hexamethylene terephthalamide _____ 6TA
Hexamethylene adipamide _____ 66
Hexamethylene pimelamide _____ 67
Hexamethylene suberamide _____ 68
Hexamethylene azelamide _____ 69
Hexamethylene sebacamide _____ 610
Hexamethylene hendecanediamide _____ 611
Hexamethylene dodecanediamide _____ 612

| Filament composition, mole percent | Average of melting point range,° C. | Appearance | Boiling water shrinkage, percent |
|---|---|---|---|
| 67/6TA 100/0 | 225 | Opaque | 9.3 |
| 67/6TA 80/20 | 219 | Transparnt | 19.3 |
| 67/6TA 70/30 | 235 | do | 26.9 |
| 67/6TA 60/40 | 258 | do | 29.4 |
| 67/6TA 50/50 | 275 | do | 25.2 |
| 68/6TA 100/0 | 232 | Opaque | 8.2 |
| 68/6TA 80/20 | 217 | Transparent | 12.1 |
| 68/6TA 70/30 | 219 | do | 15.0 |
| 68/6TA 60/40 | 262 | do | 17.5 |
| 68/6TA 50/50 | 279 | do | 17.1 |
| 68/6TA 40/60 | 312 | Opaque | 41.8 |
| 69/6TA 100/0 | 218 | do | 9.7 |
| 69/6TA 80/20 | 194 | Transparent | 22.3 |
| 69/6TA 70/30 | 223 | do | 24.4 |
| 69/6TA 60/40 | 247 | do | 31.3 |
| 69/6TA 50/50 | 280 | do | 23.3 |
| 610/6TA 100/0 | 218 | Opaque | 8.4 |
| 610/6TA 80/20 | 209 | Transparent | 16.7 |
| 610/6TA 70/30 | 229 | do | 18.0 |
| 610/6TA 60/40 | 257 | do | 19.4 |
| 610/6TA 50/50 | 285 | do | 19.5 |
| 610/6TA 40/60 | 307 | Opaque | 14.0 |
| 611/6TA 100/0 | 215 | Translucent | 10.2 |
| 611/6TA 80/20 | 185 | Transparent | 20.3 |
| 611/6TA 70/30 | 228 | do | 19.8 |
| 611/6TA 60/40 | 260 | do | 29.8 |
| 611/6TA 50/50 | 268 | do | 20.5 |
| 611/6TA 40/60 | 316 | Opaque | 20.6 |
| 612/6TA 100/0 | 215 | do | 11.25 |
| 612/6TA 80/20 | 197 | Transparent | 17.8 |
| 612/6TA 70/30 | 221 | do | 19.2 |
| 612/6TA 60/40 | 221 | do | 19.8 |
| 612/6TA 50/50 | 263 | Translucent | 40.9 |
| 66/6TA 100/0 | 264 | Opaque | 9.2 |
| 66/6TA 80/20 | 266 | do | 10.0 |
| 66/6TA 70/30 | 280 | do | 11.3 |
| 66/6TA 60/40 | 305 | do | 12.9 |

The data in the above table clearly indicate that the copolyamides of the present invention have greatly increased shrinkage over polyamides containing merely 67, 68, 69, 610, 611 or 612 units or over copolyamides containing 66 and 6TA units. This is indeed surprising since the copolyamides of the present invention would be expected to have shrinkage characteristics similar to the characteristics of copolyamides consisting of 66 and 6TA units. However, as indicated by the data in the table copolyamides consisting of 66 and 6TA units exhibits very little increase in shrinkage over nylon 66. Moreover, the copolyamides of the present invention are transparent, whereas polyamides consisting of 66, 67, 68, 69, 610, 611, 612 or copolyamides of 66 and 6TA are either opaque or transulcent.

Many widely different embodiments of this invention may be made without departing from the scope and spirit thereof and it is to be understood that the invention is not to be limited by the specific embodiments set forth herein but only by the claims which follow.

We claim:
1. A fiber-forming polyamide consisting of 50 to 80 mole percent of randomly recurring units of the formula

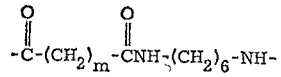

and 50 to 20 mole percent of randomly recurring units of the formula

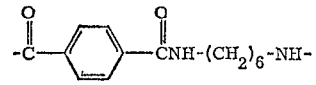

wherein $m$ is an integer of from 5 to 12.
2. The polyamide of claim 1 wherein $m$ is 5.
3. The polyamide of claim 1 wherein $m$ is 6.
4. The polyamide of claim 1 wherein $m$ is 7.
5. The polyamide of claim 1 wherein $m$ is 8.
6. The polyamide of claim 1 wherein $m$ is 9.
7. Thepolyamide of claim 1 wherein $m$ is 10.
8. The polyamide of claim 1 wherein $m$ is 11.
9. The polyamide of claim 1 wherein $m$ is 12.
10. A textile fiber consisting of the polyamide of claim 1.

References Cited

UNITED STATES PATENTS 3,475,387  10/1969  Carter et al. _____ 260—78 R

HAROLD D. ANDERSON, Primary Examiner

U.S. Cl. X.R.

57—140 R; 161—169